(12) United States Patent
Jonsson (10) Patent No.: US 7,381,015 B2
(45) Date of Patent: Jun. 3, 2008

(54) CUTTING INSERT, A CUTTING TOOL, A SHIM AND A METHOD

(75) Inventor: Mats Jonsson, Hedemora (SE)

(73) Assignee: Seco Tools AB, Fagersta (SE)

( * ) Notice: Subject to any disclaimer, the term of this patent is extended or adjusted under 35 U.S.C. 154(b) by 241 days.

(21) Appl. No.: 11/160,349

(22) Filed: Jun. 20, 2005

(65) Prior Publication Data

US 2005/0244233 A1 Nov. 3, 2005

Related U.S. Application Data

(63) Continuation of application No. PCT/SE03/02002, filed on Dec. 17, 2003.

(30) Foreign Application Priority Data

Dec. 20, 2002 (SE) .................................. 0203865

(51) Int. Cl.
*B26D 3/00* (2006.01)
*B26D 1/00* (2006.01)

(52) U.S. Cl. .................. 407/116; 407/113; 407/115

(58) Field of Classification Search .................. 407/46, 407/68, 101, 113–117, 82
See application file for complete search history.

(56) References Cited

U.S. PATENT DOCUMENTS

| | | | |
|---|---|---|---|
| 5,478,175 A | 12/1995 | Kraemer | |
| 5,682,803 A * | 11/1997 | Boianjiu | 82/1.11 |
| 5,810,518 A | 9/1998 | Wiman et al. | |

(Continued)

FOREIGN PATENT DOCUMENTS

EP 0596843 5/1994

(Continued)

OTHER PUBLICATIONS

International Search Report for corresponding PCT/SE2003/002002.

*Primary Examiner*—Willmon Fridie
(74) *Attorney, Agent, or Firm*—WRB-IP LLP (57) ABSTRACT

The present invention relates to a cutting insert, a cutting tool for chip removing machining, a shim as well as a method for mounting a cutting insert. The cutting tool includes a holder equipped with at least one insert pocket including a base surface, at least one circular shim including opposite first and second surfaces, and at least one cutting insert, which includes a circular cutting edge formed at a transition between an upper side and an edge surface of the cutting insert. The upper side includes a chip surface comprising at least one chip breaker portion and the edge surface includes a clearance surface. The shim is provided between the base surface of the insert pocket and the cutting insert. The cutting tool includes a clamping arrangement for holding its parts together. The chip breaker portion is provided at a varying distance from the associated cutting edge. The shim and the cutting insert include at least one pair of cooperating projection and recess for indexing of the cutting insert. The pair of cooperating projection and recess is provided to be positioned in a position relative to a reference line or axis of the tool in order to orient the chip breaker portion in the chip surface to a desired relative position. The number of chip breaker portions is a multiple of the number of projections or recesses.

12 Claims, 5 Drawing Sheets

U.S. PATENT DOCUMENTS

| | | | |
|---|---|---|---|
| 5,888,029 A * | 3/1999 | Boianjiu | 407/66 |
| 5,931,613 A * | 8/1999 | Larsson | 407/103 |
| 6,050,751 A | 4/2000 | Hellstrom | |
| 6,050,752 A * | 4/2000 | DeRoche | 407/114 |
| 6,152,658 A | 11/2000 | Satran et al. | |
| 6,164,878 A | 12/2000 | Satran et al. | |
| 6,168,356 B1 * | 1/2001 | Sjoo et al. | 407/104 |
| 6,190,096 B1 * | 2/2001 | Arthur | 407/113 |
| 6,343,898 B1 * | 2/2002 | Sjoo et al. | 407/101 |
| 6,540,448 B2 * | 4/2003 | Johnson | 407/35 |
| 2002/0168235 A1 | 11/2002 | Johnson | |

FOREIGN PATENT DOCUMENTS

JP     8174311     7/1996

* cited by examiner

FIG. 7C

CUTTING INSERT, A CUTTING TOOL, A SHIM AND A METHOD

The present application is a continuation of PCT/SE2003/002002, filed Dec. 17, 2003, which claims priority of SE 0203865-1, filed Dec. 20, 2002, both of which applications are incorporated by reference.

BACKGROUND AND SUMMARY

The present invention relates to a cutting insert, a cutting tool for chip removing machining, a shim as well as a method for mounting a cutting insert according to the preambles of the independent claims.

In tools for metal machining round cutting inserts of hard and wear resistant material such as cemented carbide are often used. A problem, which is created at use of round cutting insert, is that the cutting insert tends to be twisted arbitrary in the holder both by the operator and by the cutting forces. Through a number of documents, for example U.S. Pat. Nos. 6,146,060, 5,478,175, 3,383,748 and 5,346,336 different solutions are proposed in order to lock the round cutting insert in the holder. Round cutting inserts have a problematic chip-breaking pattern.

Round cutting inserts have, for example, a difficulty with breaking chips at small cutting depths and at small feeds. There are, however, round cutting inserts with chip breaker that to some extent solve the later problem such as in U.S. Pat. Nos. 5,478,175 and 3,383,748. In U.S. Pat. No. 5,346,336 a circular cutting insert is shown provided with five plane facets distributed at even partition on the clearance surface. The facets are provided to constitute defined positions in connection with indexing of the cutting insert. Each facet forms an acute angle with the center axis of the cutting insert. A locking screw locks the cutting insert to the pocket of the holder insert. A problem with the latter circular cutting insert is that it has difficulties to break chips at small cutting depths and small feeds.

Other documents showing circular cutting inserts are JP Patent Document No. 08-174311 and U.S. Pat. No. 6,164,878.

It is desirable to provide a cutting insert, which avoids the above-captioned drawbacks.

It is also desirable to provide a cutting insert, which can break chips at small cutting depths and small feeds.

It is also desirable to provide a cutting insert, which comprises a built-in positioning of the chip breaker portion.

It is also desirable to provide a tool and a cutting insert that comprise an adjustable chip breaker portion.

It is also desirable to provide a tool, a cutting insert, a shim and a method, wherein the cutting insert can be indexed exactly in a simple manner.

According to an aspect of the present invention, a cutting insert for chip removing machining comprises a substantially circular cutting edge formed at a transition between an upper side and an edge surface of the cutting insert, the upper side comprising a chip surface including at least one chip breaker portion and the edge surface comprising a clearance surface, the edge surface connecting to a lower side of the cutting insert, the lower side comprising at least one of a projection and a recess for indexing of the cutting insert. The chip breaker portion is provided at a varying distance from the associated cutting edge, the at least one of the projection and the recess is provided at a position relative to a reference line or axis of the tool in order to orient the chip breaker portion in the chip surface to a desired position, and a quantity of chip breaker portions is a multiple of a quantity of the at least one of the projection and the recess.

In accordance with another aspect of the present invention, a circular shim for a cutting tool as described above is provided. The shim is adapted to be placed in the at least one insert pocket in order to support a circular cutting insert in the cutting tool. The shim comprises opposite first and second surfaces and a central hole. The first surface of the shim comprises an abutment surface for abutting against the at least one insert pocket, and the second surface of the shim comprises an abutment surface for abutting against the circular cutting insert and at least one of a projection and a recess for indexing of the cutting insert.

In accordance with another aspect of the present invention, a method for mounting a cutting insert in a holder for chip removing machining is provided. The cutting insert has a substantially circular basic shape and comprises at least one cutting edge formed at a transition between an upper side and an edge surface of the cutting insert. The upper side comprises a chip surface comprising at least one chip breaker portion and the edge surface comprising a clearance surface. The cutting tool comprises a clamp for holding the cutting insert and the holder together. The cutting insert has at least one of a projection and a recess on its lower side. According to the method, a holder including at least one insert pocket with a base surface is provided. A circular shim is provided in the insert pocket, the shim comprising opposite first and second surfaces and a central hole, the first surface comprising an abutment surface for abutting against the base surface, the second surface comprising at least one of a projection and a recess for mating with the at least one of the projection and the recess on the lower side of the cutting insert. The cutting insert is provided with a quantity of chip breaker portions that is a multiple of a quantity of the at least one of the projection and the recess on the lower side of the cutting insert. The shim is screwed, with a screw, in position relative to the base surface such that the shim can be rotated. The cutting insert is positioned on the shim in such a manner that at least one of the at least one of the projection and the recess on the lower side of the cutting insert fits to a counterpart one of the at least one of the projection and the recess on the second surface of the shim. The cutting insert and the shim are rotated together until a desired position for the chip breaker portion relative to the holder has been obtained. The cutting insert is removed and the screw is tightened such that the shim is fixed in a desired position. The cutting insert is mounted in the position and the cutting insert is fixed in the pocket by a clamping arrangement.

BRIEF DESCRIPTION OF THE DRAWINGS

An embodiment of the cutting tool according to the present invention is described below with reference to the enclosed drawings, wherein.

DETAILED DESCRIPTION

The cutting insert 10 in FIGS. 1A-1D has a substantially circular basic shape and comprises an upper side 11, a lower side 12 and a truncated, substantially conical, edge surface 13, which substantially connects the upper 11 and lower sides 12. The cutting insert 10 side 11 is shown as a grid, which is not visible on the physical specimen of the cutting insert.

Figures 1A, 1B, 1D, 1E, 1F:
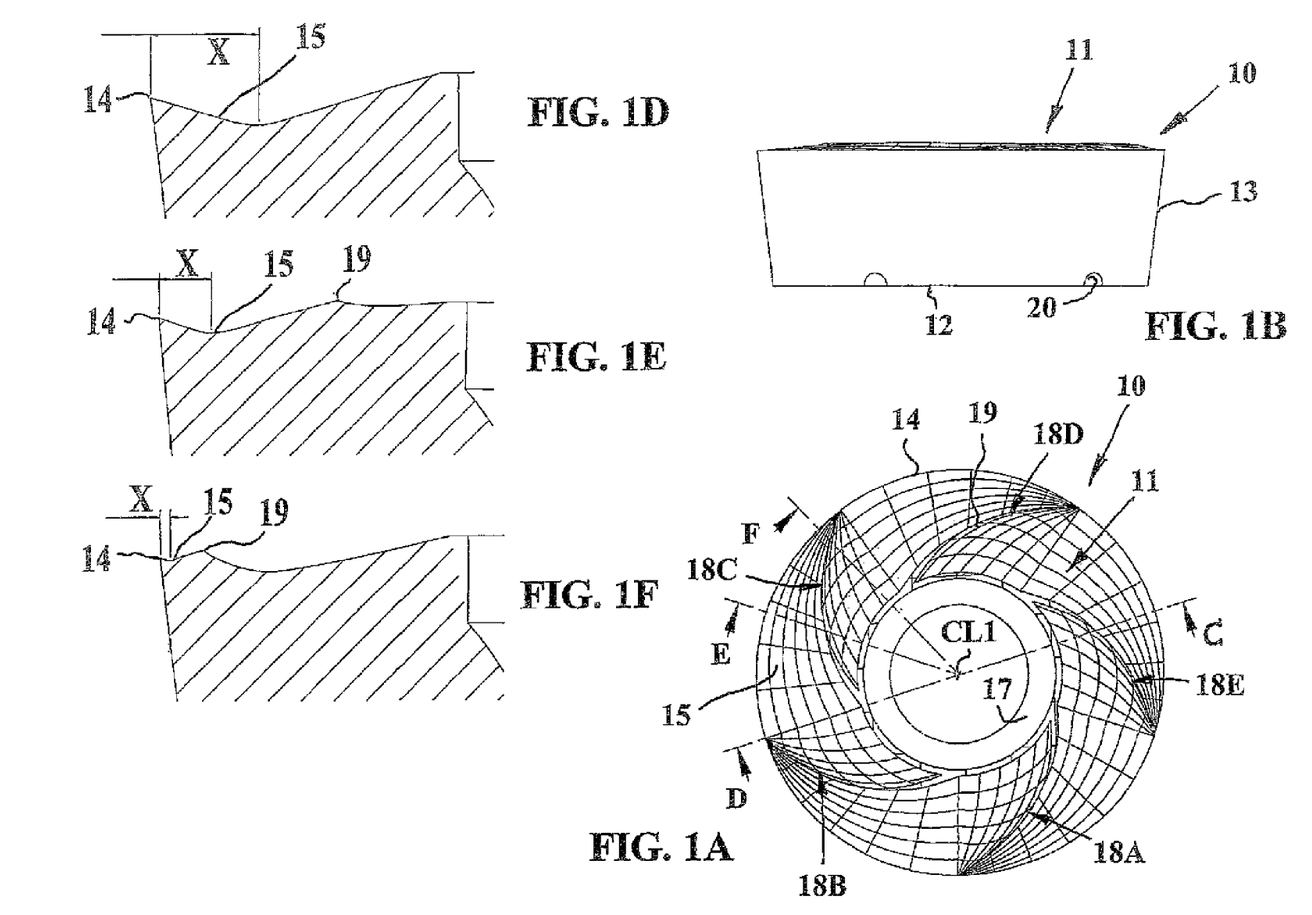
FIG. 1A shows a top view of a cutting insert according to the present invention.
FIG. 1B shows a side view of the cutting insert in FIG. 1A.
FIG. 1D shows an enlarged, partial cross-section along line D in FIG. 1A.
FIG. 1E shows an enlarged, partial cross-section along line E in FIG. 1A.
FIG. 1F shows an enlarged, partial cross-section along line F in FIG. 1A.

Said grid shall substantially be understood as altitude contour. The cutting insert 10 is single-sided and has a positive geometry, that is the edge surface 13 forms an inner acute angle with the upper side 11. The upper side 11 comprises a chip surface 15 while the edge surface 13 constitutes a clearance surface. The upper side 11 comprises a circular cutting edge 14, localized at the periphery of the cutting insert 10. The chip surface 15 is substantially concave and slopes radially inwardly and downwardly from the cutting edge 14 and then rises above the plane of the cutting edge. The cutting edge 14 is provided at the line of intersection between the edge surface 13 and the chip surface 15 and constitutes the most peripheral part of the upper side 11. The edge surface 13 coincides with a portion of an imaginary cone. The tip of the cone intersects the centerline CL1 of the cutting insert below the lower side 12.

In the shown embodiment the cutting insert 10 has been provided with a fastening hole 17 intended to receive a fastening screw (not shown) which shall secure the cutting insert 10 to the insert holder.

The chip surface 15 comprises five chip breaker portions 18 or 18A, 18B, 18C, 18D, 18E provided at even partition, that is with partition of 72.

The radially innermost parts of the chip breaker portion are provided above the edge of the insert 14 planar. Each chip breaker portion 18 extends with varying distance from the associated cutting edge 14. Each chip breaker portion 18 comprises a ridge 19 that follows a curved path from about 0.02 mm from the periphery and further in direction towards the fastening hole 17 of the cutting insert. The ridge 19 successively rises in direction towards the fastening hole 17. The curved path may be defined by a radius of the same order of magnitude as the radius that defines the periphery of the cutting insert. The radius center for the curved path is provided within the periphery of the cutting insert. Each chip breaker portion 18 preferably extends with continously increasing distance from the associated cutting edge 14 in direction towards an adjacent chip breaker, i. e. the ridge 19 becomes increasingly spaced from the cutting edge in direction towards an adjacent chip breaker. Generally, the ridge 19 or a tangent thereof forms an acute angle with the associated cutting edge or a tangent thereof when the cutting insert is seen in a top view. From FIG. 1D-1E is apparent the position for the minimum point of the chip surface 15 in different cross-sections. The distance X indicates the radial distance between the minimum point and the cutting edge 14, which distance is 1.49 mm, 0.72 mm respective 0.14 mm in the shown the embodiment. The distance of the ridge 19 from the associated cutting edge 14 is a function of the distance X, that is, the distance of the ridge from the associated cutting edge 14 in a cross-section is preferably bigger than 2 times X. Furthermore, the appearance of the chip surface on each side of the ridge 19 is visible.

Alternatively, the radius center for the curved path can be provided outside of the cutting insert periphery. Alternatively the path can be parabolic or elliptical or similar. Alternatively, the ridge 19 can be constituted by a number of from each other spaced projections with substantially the same effect on the chip breaking. Alternatively, 2-4 or 6 chip breaker portions can be provided on the upper side at even partition, i. e. 180, 120, 90 and 60, respectively. A roughing insert with 2-3 chip breaker portions is used for great cutting depths while a cutting insert with 6 chip breaker portions is used for small cutting depths. Then the roughing insert with 2 chip breaker portions preferably is provided with a progressive reinforcing chamfer along the edge, that is a chamfer whose width increases between two chip breaker portions in the anticlockwise direction in FIG. 1A. Of course also the diameter of the cutting insert decides the area of application.

The lower side 12 of the cutting insert comprises a number of indexing portions 20 or 20A, 20B, 20C, 20D, 20E provided at even partition, that is with a partition of 72, and intended for indexing of the cutting insert. Each recess 20A-20E is made of a radially extending groove, the extension line of that intersects the centerline CL1 of the cutting insert.

The recess 20A-20E may start in the clearance surface 13 and thereby have open ends such as FIG. 1G shows. The recess can alternatively be developed with one or two closed ends. The geometry of the groove is such that the strength of the cutting insert is influenced as a little as possible, that is sharp corners are avoided in the groove. Simultaneously it is desirable that the groove also prevents a limited rotation of the cutting insert relative to the projection of the shim. The recess 20A-20E is provided substantially midways between two adjacent chip breaker portions when the cutting insert is seen in a top view. Each recess 20 has a width in the plane of the lower side 12 or a plane parallel thereto that is in the same order of magnitude as or less than the distance between two adjacent radially external ends of the chip breaker portions 18. In the shown embodiment the chip breaker portions are rotated 36 relative to the indexing portions. Alternatively, projections instead of recesses 20A-20E can be provided on the lower side 12. Alternatively, 2-4 or 6 recesses or projections can be provided on the lower side 12. A cutting insert shall preferably have the same number of recesses on the lower side of the cutting insert as the number of chip breaker portions on the upper side.

Figure 2A:
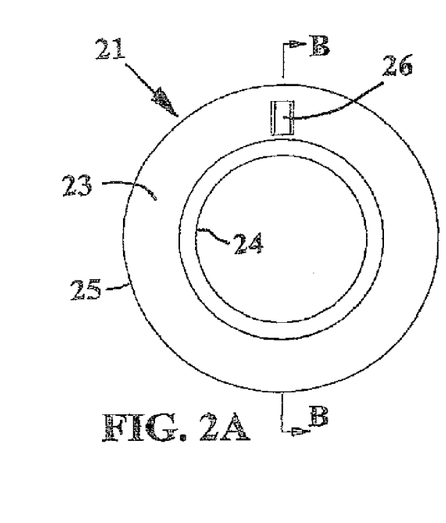
FIG. 2A shows a top view of a shim according to the present invention.
Figure 2B:
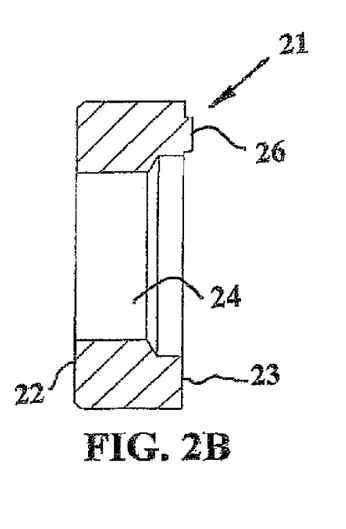
FIG. 2B shows a cross-section along line B-B in FIG. 2A.
Figure 2C:
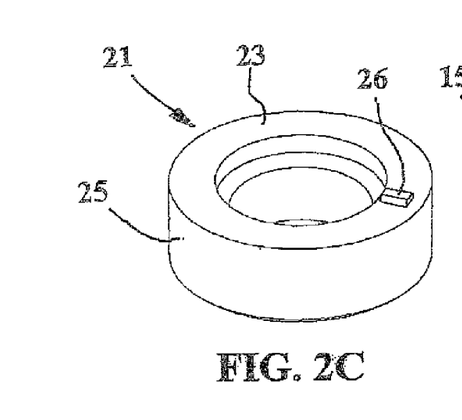
FIG. 2C shows a perspective view of the shim according to FIG. 2A.

In FIGS. 2A-2C a shim 21 according to the present invention is shown. The shim 21 is circular and comprises opposite first 22 and second 23 surfaces and a central hole 24. The surfaces 22,23 are plane parallel in order to form plane surface abutments against the insert pocket and the cutting insert. The shim has a cylindrical, circumferential surface 25. The first surface or the lower side 22 is substantially parallel with the second surface or the upper side 23. The upper side 23 has a projection or a shoulder 26. The projection 26 has a substantially radial dimension such that its imaginary extension line intersects the centerline of the shim. The projection geometry is such that it will prevent even a limited rotation relative to the active, cooperating groove of the cutting insert. The cross-section of the projection should consequently be substantially complementary with the cross-section of the groove but should have a height that is somewhat lower than the depth of the groove in order to avoid tilting of the cutting insert. Alternatively, 2, 3, 4 or 6 recesses instead of the projection 26 can be provided on the upper side 23 for the case 2, 3, 4 or 6 projections are provided in the lower side 12 of the cutting insert at even partition, i. e. 180, 120, 90, 72 or 60.

Figures 1C, 3:
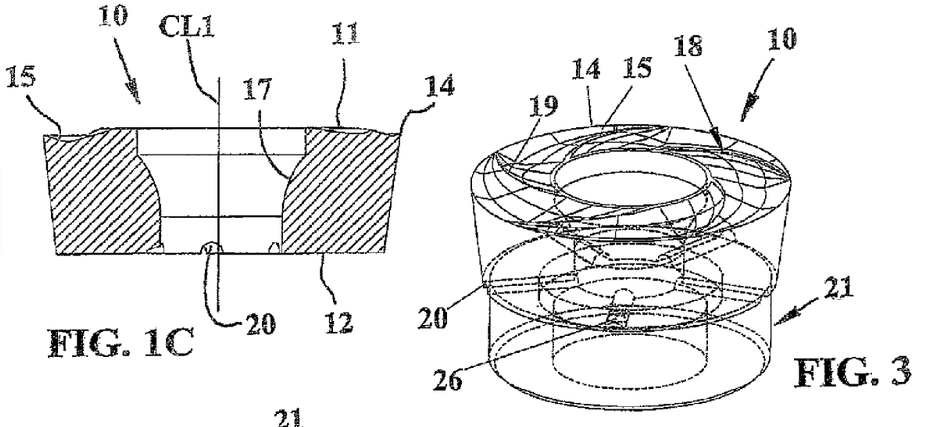
FIG. 1C shows a cross-section along line C-D in FIG. 1A.
FIG. 3 shows a perspective view of the cutting insert and the shim in cooperation with each other.
Figure 1G:
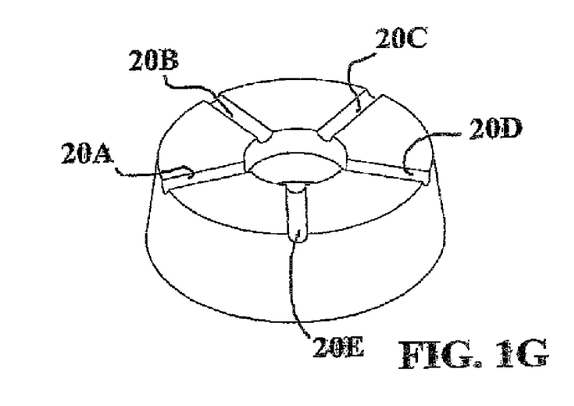
FIG. 1G shows a perspective view from below of the cutting insert according to FIG. 1A.
Figure 4:
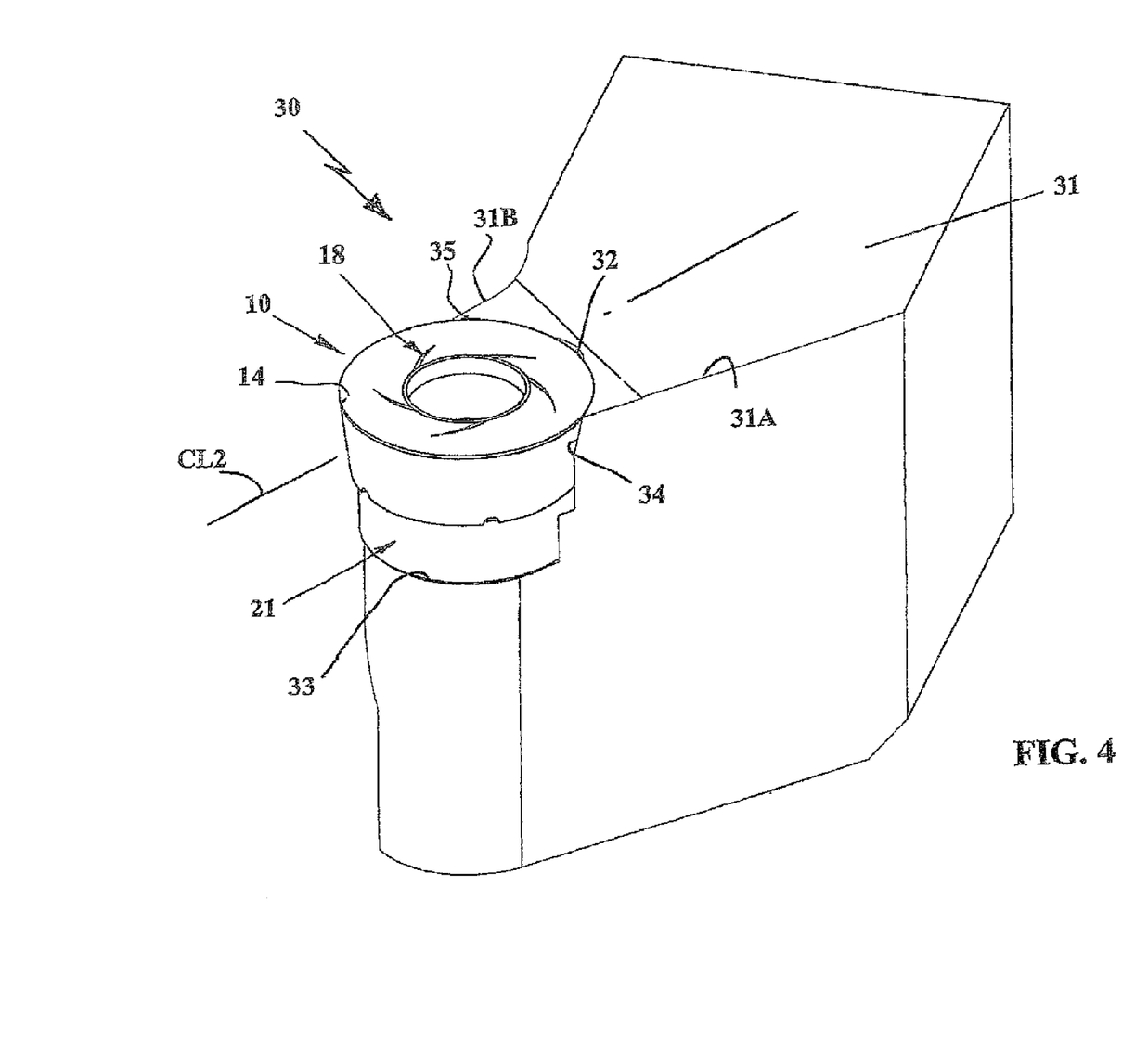
FIG. 4 shows a tool according to the present invention in a perspective view.

With reference now to FIGS. 3 and 4 a cutting tool 30 according to the present invention is shown. The cutting tool comprises a holder 31, which is a holder for a turning tool having a pocket 32 in order to receive cutting inserts. The pocket comprises a substantially planar base surface 33 and upright shoulders 34,35. Each shoulder has an upper concave surface, provided to abut against the edge surface 13 of the cutting insert. A threaded boring is provided close but not in the base surface 33 center, in order for a locking screw in a known manner to be able to force the cutting insert against shoulders and the base surface 33. The shim 21 is provided to be fastened in a conventional manner by a locking screw, not shown.

Such a locking screw has an external thread as well as an internal thread in order to receive another screw for fastening the cutting insert after the shim has been secured. Each recess 20A-20E is provided in a position relative to a reference line or axis CL2 of the tool, see FIG. 4, to orient the chip breaker portion 18A-18E in the chip surface 15 to a desired position.

The tool's axis CL2 coincides with the bisector for an angle between edges 31A and 31B of the holder that connect to the shoulders 34,35 or with a normal to the center line CL1 of the cutting insert. In a milling tool the axis CL2 is the rotational axis of the tool. The number of chip breaker portions 18A-18E is a multiple of the number of projections or recesses 20A-20E, wherein the multiple preferably being integers of 1,2, 3 or 4.

In a conventional holder the conventional circular shim is replaced by a shim according to the present invention. The shim has a central hole provided with a collar against which a screw is drawn lightly. Thereby the shim can be rotated by hand. The cutting insert according to the present invention is placed on the shim in such a manner that some of the recesses 20A-20E in the lower side 12 of the cutting insert fits against the indexing projection of the shim. In this position the cutting insert and the shim continuously are rotated together until the desired position for the chip breaker portion 18A-18E has been obtained. The desired position of the projection should be as close as possible in line with or parallel with the tool's axis CL2, in order to minimize loads on the projection at the screw-tightening of the cutting insert against the shim. The cutting insert is then removed and the screw is tightened such that the shim is secured in desired position. Then the cutting insert is mounted again in the above-mentioned position and a means for fastening, such as a clamp or another screw or a combination thereof, is tightened. Since the chip breaker portions of the cutting insert are adapted to the recesses 20A-20E in the lower side of the cutting insert and the indexing projection 26 in the shim a new edge can be indexed into position or the cutting insert can be replaced and obtain exact the same chip breaking as the former worn-out cutting edge.

In addition, the cutting insert is fully utilized since the indexing becomes more exact. The chip breaker portion 18A-18E is developed to be able to increase or diminish tendency for chip breaking, and thereby to be able to vary the cutting forces, depending on how the shim and thereby the cutting insert initially was positioned.

Figure 5A:
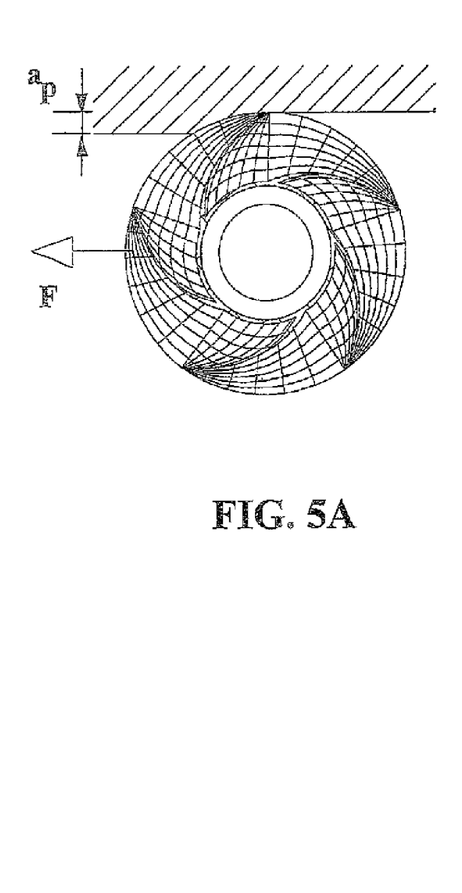
FIGS. 5A, 5B and 5C show the cutting insert according to the present invention in a top view in different engagements with a work piece.
Figure 5B:
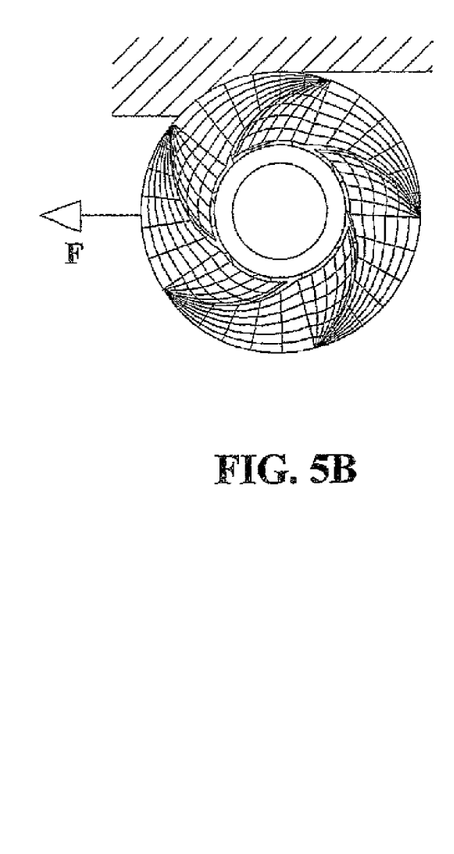
Figure 5C:
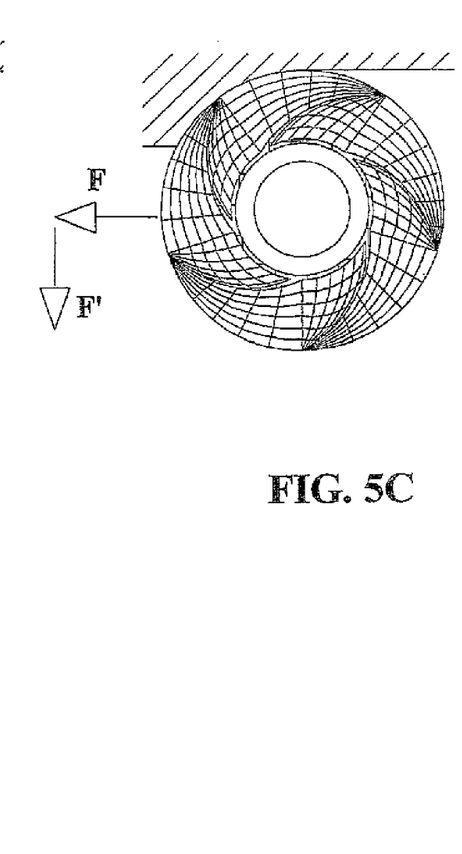

Thus the chip breaker portion 18A-18E is adjusted such as in FIG. 5A in order to obtain good chip breaking at turning with a little cutting depth $a_p$ and/or low feed speed in the feed direction F. The chip breaker portion 18A-18E is provided close to the active part of the circular cutting edge 14, or as close as possible to the rotational axis of the workpiece. This is a preferred position also at turning of hard-to-break material. The chip breaker portion 18A-18E is adjusted such as in FIG. 5B in order to obtain good chip breaking at turning with medium-sized cutting depth and/or medium-sized feed speed. The chip breaker portion 18A-18E is provided farther from the active part of the circular cutting edge 14, or farther from the rotational axis of the workpiece than in FIG. 5A. The chip breaker portion is adjusted such as in FIG. 5C in order to obtain good chip breaking at turning with great cutting depth and/or high feed speed. The chip breaker portion is provided farther from the active part of the circular cutting edge 14, or farther from the rotational axis of the workpiece than in FIG. 5B. A new chip breaker portion enters into position according to FIG. 5C, which gives a positive contribution as regards chip breaking at heavier longitudinal turning with great cutting depth or at planing/copying with feed motion in the feed direction F', that is at least partially in radial direction. At machining against and of a 90 corner, with an intermediate radius, a cutting insert having four chip breaker portions can be used with advantage. Then the same chip breaker adjustment at the longitudinal turning can be obtained as at machining of an adjacent collar. The useable interval for adjustment of the cutting insert is within about 40, that is from 0-40, having the position according to FIG. 5A as reference(0). The size of the interval for adjustment depends on the number of chip breaker portions on the cutting insert.

Figure 6A:
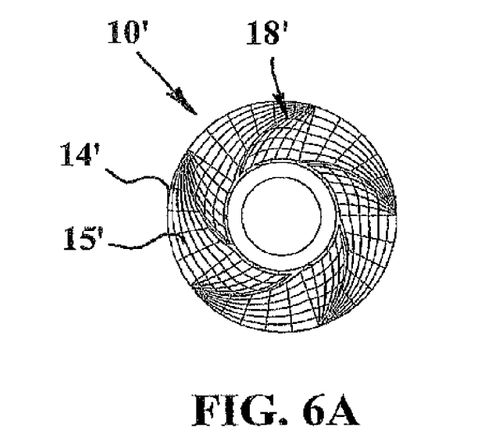
FIGS. 6A-6C show an alternative embodiment of a cutting insert for chip removing machining according to the present invention in a top view, in a side view and in a perspective view, respectively.
Figure 6B:
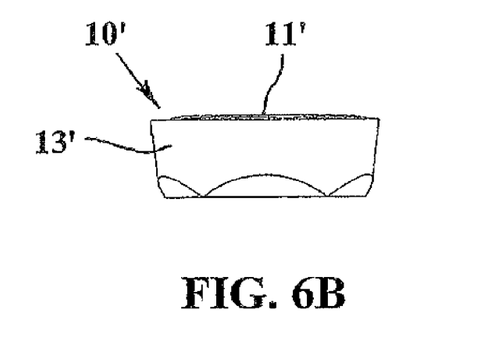
Figure 6C:
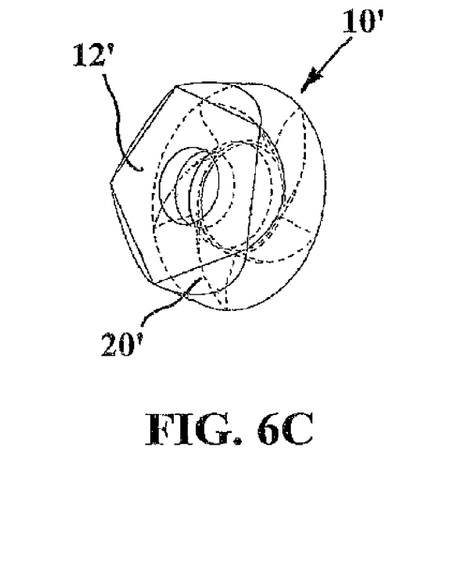

An alternative embodiment of a single-sided cutting insert 10' for chip removing machining is shown in FIGS. 6A-6C. The cutting insert is intended to be supported by a conventional shim or by the base surface of the insert pocket. The cutting insert 10' is circular and comprises means, such as five planar facets 20' distributed at even partition in the edge surface 13' for indexing of the cutting insert in the holder, not shown. Facets are provided to constitute defined positions in connection with indexing of the cutting insert. Each facet forms an acute angle with the center axis of the cutting insert. The cutting insert 10' has a substantially circular cutting edge 14' formed at the transition between an upper side 11' and the edge surface 13' of the cutting insert. The upper side 11' comprises a chip surface 15' including at least one chip breaker portion 18'. The edge surface 13' constitutes a clearance surface. The edge surface 13' may have another geometry, for example convex or concave in cross-section or may comprise recesses. The chip breaker portion 18' is provided at varying distance from the associated cutting edge 14'. Each facet 20' is provided in a position relative to a reference line or axis of the tool, see FIG. 4, in order to orient the chip breaker portion 18' in the chip surface 15' to a desired position. The cutting insert has a facet for each chip breaker portion and the cutting insert thereby obtains five fixed positions relative to the holder.

Each facet 20' has a width in the plane of the lower side 12' that is in the same order of magnitude or less than the distance between two adjacent radially external ends of the chip breaker portions 18'.

Figure 7A:
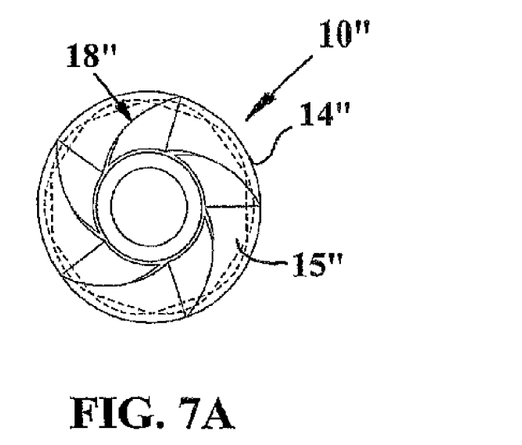
FIGS. 7A-7C show an additional alternative embodiment of a cutting insert for chip removing machining according to the present invention in a top view, in a side view and in a perspective view, respectively.
Figure 7B:
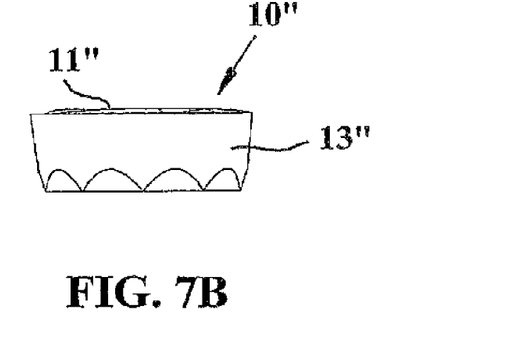
Figure 7C:
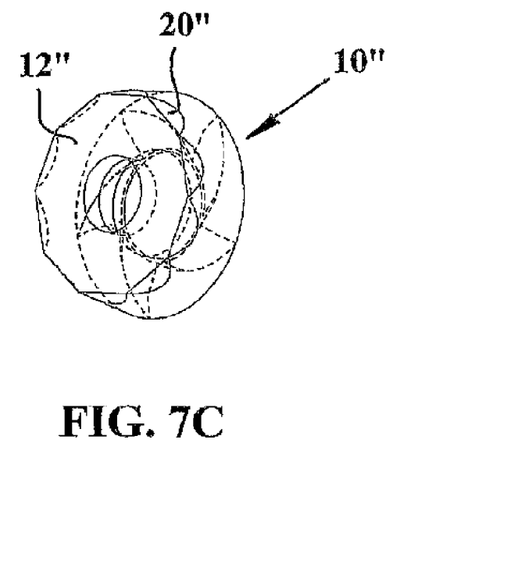

An additional alternative embodiment of a single-sided cutting insert 10" for chip removing machining, is shown in FIGS. 7A-7C. The cutting insert is intended to be supported by a conventional shim or by the base surface of the insert pocket. The cutting insert 10" is circular and comprises means, such as ten planar facets 20" distributed at even partition in the edge surface 13" for indexing of the cutting insert in the holder, not shown. Facets are provided to constitute defined positions in connection with indexing of the cutting insert. Each facet forms an acute angle with the center axis of the cutting insert. The cutting insert 10" has a substantially circular cutting edge 14" formed at the transition between an upper side 11" and the edge surface 13" of the cutting insert. The edge surface 13" may have another geometry, for example convex or concave in cross-section or comprise recesses. The upper side 11" comprises a chip surface 15" including at least one chip breaker portion 18". The edge surface 13" constitutes a clearance surface. The chip breaker portion 18" is provided at varying distance from the associated cutting edge 14". Each facet 20" is provided in a position relative to a reference line or axis of the tool, see FIG. 4, in order to orient the chip breaker portion 18" in the chip surface 15" to a desired position. The cutting insert has two facets for each chip breaker portion in order to enable two different positions for the chip breaker relative to the holder. The cutting insert thereby obtains ten fixed positions relative to the holder. Each facet 20" has a width in the plane of the lower side 12" that is smaller than the distance between two adjacent radially external ends of chip breaker portions 18".

Thus the present invention relates to a tool and a cutting insert, which can break chips at small cutting depths and at small feeds with the aid of an adjustable chip breaker portion, wherein the cutting insert simply can be exactly indexed. Furthermore, the shown cutting insert can be used in a conventional holder with or without conventional or a shim according to the present invention.

Although the described embodiment of the invention relates to a turning application the invention is also applicable on milling tools where round cutting inserts are provided at the tool's periphery. The cutting insert is shown here as a right-hand design, but its geometry can of course be mirror-inverted and exhibit a left-hand design.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

The invention is in no manner limited to the described embodiments above, but can be varied within the limits of the subsequent claims.

Different combinations of the above-captioned cutting insert geometries are conceivable.

What is claimed is:

1. A cutting insert for chip removing machining, comprising a substantially circular cutting edge formed at a transition between an upper side and an edge surface of the cutting insert, the cutting edge comprising at least one cutting edge portion, the at least one cutting edge portion extending along substantially an entire length of the cutting edge, the upper side comprising a chip surface including at least one chip breaker portion associated with a corresponding cutting edge portion and the edge surface comprising a clearance surface, the edge surface connecting to a lower side of the cutting insert, the lower side comprising at least one of a projection and a recess for indexing of the cutting insert, wherein the at least one chip breaker portion is provided at a varying distance from the associated cutting edge portion over substantially an entire length of the associated cutting edge portion, the at least one of the projection and the recess is provided at a position relative to a reference line or axis of the tool in order to orient the chip breaker portion in the chip surface to a desired position, and a quantity of chip breaker portions is a multiple of a quantity of the at least one of the projection and the recess.

2. The cutting insert according to claim 1, wherein the cutting insert is single-sided, a plurality of chip breaker portions are evenly radially spaced on the chip surface, and a plurality of the at least one of the projections and the recesses are evenly radially spaced on the lower side of the cutting insert.

3. The cutting insert according to claim 2, wherein each chip breaker portion comprises a ridge which follows a curved path substantially in a direction toward a center of the cutting insert and the cutting insert has a same quantity of the at least one of the projections and the recesses on the lower side of the cutting insert as a quantity of chip breaker portions on the upper side.

4. The cutting insert according to claim 1, wherein each chip breaker portion comprises a ridge which follows a curved path substantially in a direction toward a center of the cutting insert and the cutting insert has a same quantity of the at least one of the projections and the recesses on the lower side of the cutting insert as a number of chip breaker portions on the upper side.

5. The cutting insert according to claim 1, wherein the at least one of the projection and the recess is provided substantially midway between two adjacent chip breaker portions when the cutting insert is seen in a top view.

6. A cutting tool for chip removing machining, comprising
a holder equipped with at least one insert pocket including a base surface,
at least one circular shim comprising opposite first and second surfaces, and
at least one cutting insert comprising a circular cutting edge formed at a transition between an upper side and an edge surface of the cutting insert, the cutting edge comprising at least one cutting edge portion, the at least one cutting edge portion extending along substantially an entire length of the cutting edge, the upper side comprising a chip surface including at least one chip breaker portion associated with a corresponding cutting edge portion and the edge surface comprising a clearance surface, the at least one shim being provided between the base surface of the at least one insert pocket and the at least one cutting insert, the cutting tool comprising a clamp arrangement for holding the holder, the at least one shim, and the at least one insert together, wherein the at least one cutting insert is single-sided and the at least one chip breaker portion is provided at a varying distance from the cutting edge portion over substantially an entire length of the associated cutting edge portion, the at least one shim and the at least one cutting insert comprises at least one pair of cooperating projections and recesses for indexing of the cutting insert, the at least one pair of projections and recesses being provided to be positioned in a position relative to a reference line or axis of the tool in order to orient the chip breaker portion in the chip surface to a desired relative position, a quantity of the at least one chip breaker portion being a multiple of a quantity of the at least one pair of projections and recesses.

7. The cutting tool according to claim 6, wherein the at least one cutting insert is single-sided and the base surface of the at least one insert pocket and of the at least one shim first surface are plane parallel.

8. The cutting tool according to claim 7, wherein a plurality of chip breaker portions are evenly radially spaced on the chip surface and a plurality of at least one of projections and recesses are evenly spaced on the lower side of the cutting insert, and the at least one cutting insert has the same quantity of the at least one of projections and recesses on the lower side of the cutting insert as the quantity of chip breaker portions on the upper side.

9. The cutting tool according to claim 6, wherein a plurality of chip breaker portions are evenly radially spaced on the chip surface and a plurality of at least one of projections and recesses are evenly spaced on the lower side of the cutting insert, and the at least one cutting insert has the same quantity of the at least one of projections and recesses on the lower side of the cutting insert as the quantity of chip breaker portions on the upper side.

10. The cutting tool according to claim 6, wherein at least one of a projection and a recess of the at least one pair of projections and recesses is provided substantially midway between two adjacent chip breaker portions when the cutting insert is seen in a top view.

11. The cutting tool according to claim 6, wherein the shim is adapted to be placed in the al least one insert pocket in order to support a circular cutting insert in the cutting tool, the shim comprising opposite first and second surfaces and a central hole, wherein the first surface of the shim comprises an abutment surface for abutting against the at least one insert pocket, and the second surface of the shim comprises an abutment surface for abutting against the circular cutting insert and at least one of a projection and a recess for indexing of the cutting insert.

12. A circular shim for the cutting tool according to claim 6, wherein the shim is adapted to be placed in the at least one insert pocket in order to support a circular cutting insert in the cutting tool, the shim comprising opposite first and second surfaces and a central hole, wherein the first surface of the shim comprises an abutment surface for abutting against the at least one insert pocket, and the second surface of the shim comprises an abutment surface for abutting against the circular cutting insert and at least one of a projection and a recess for indexing of the cutting insert.

* * * * *